United States Patent Office

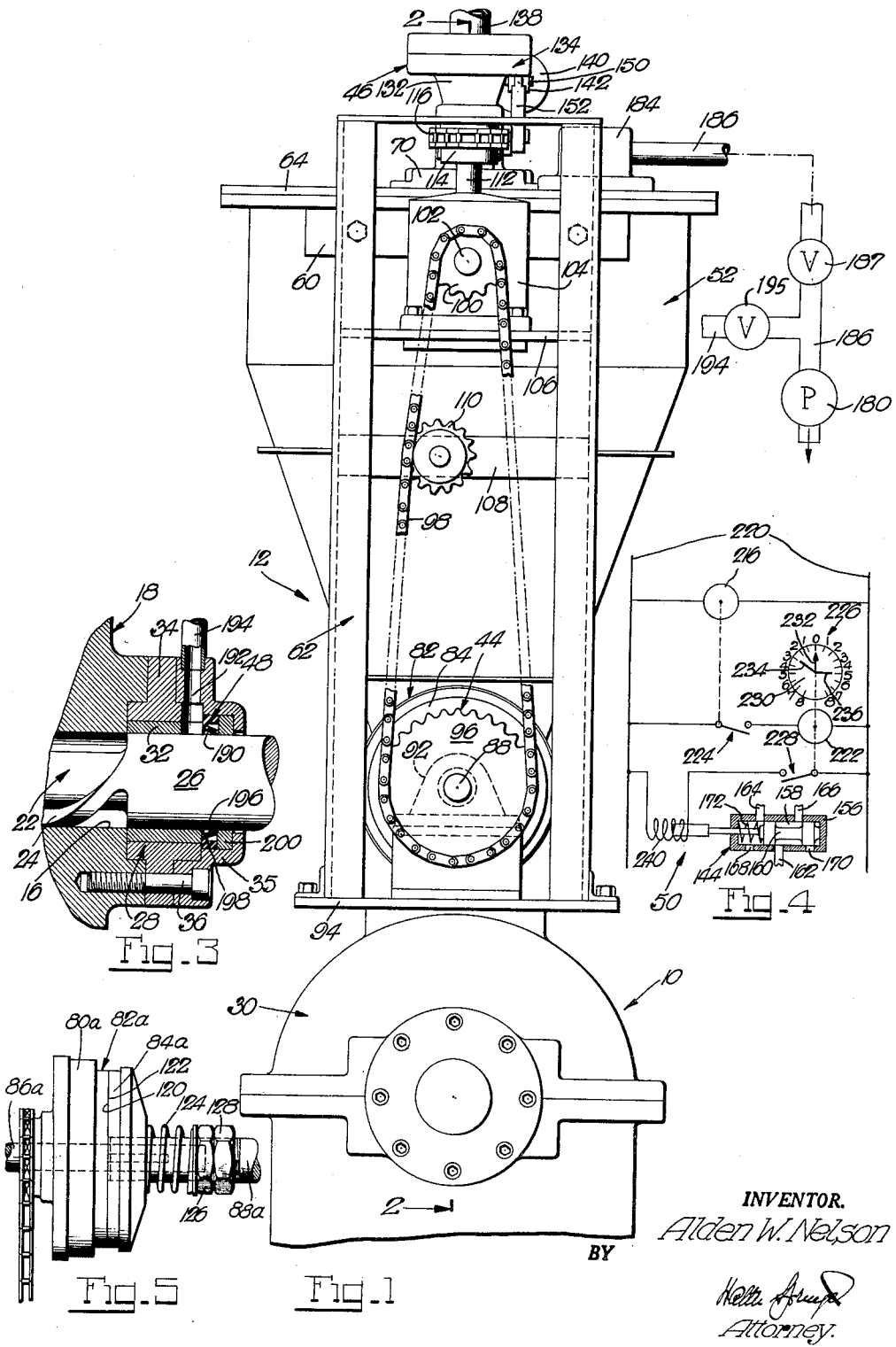

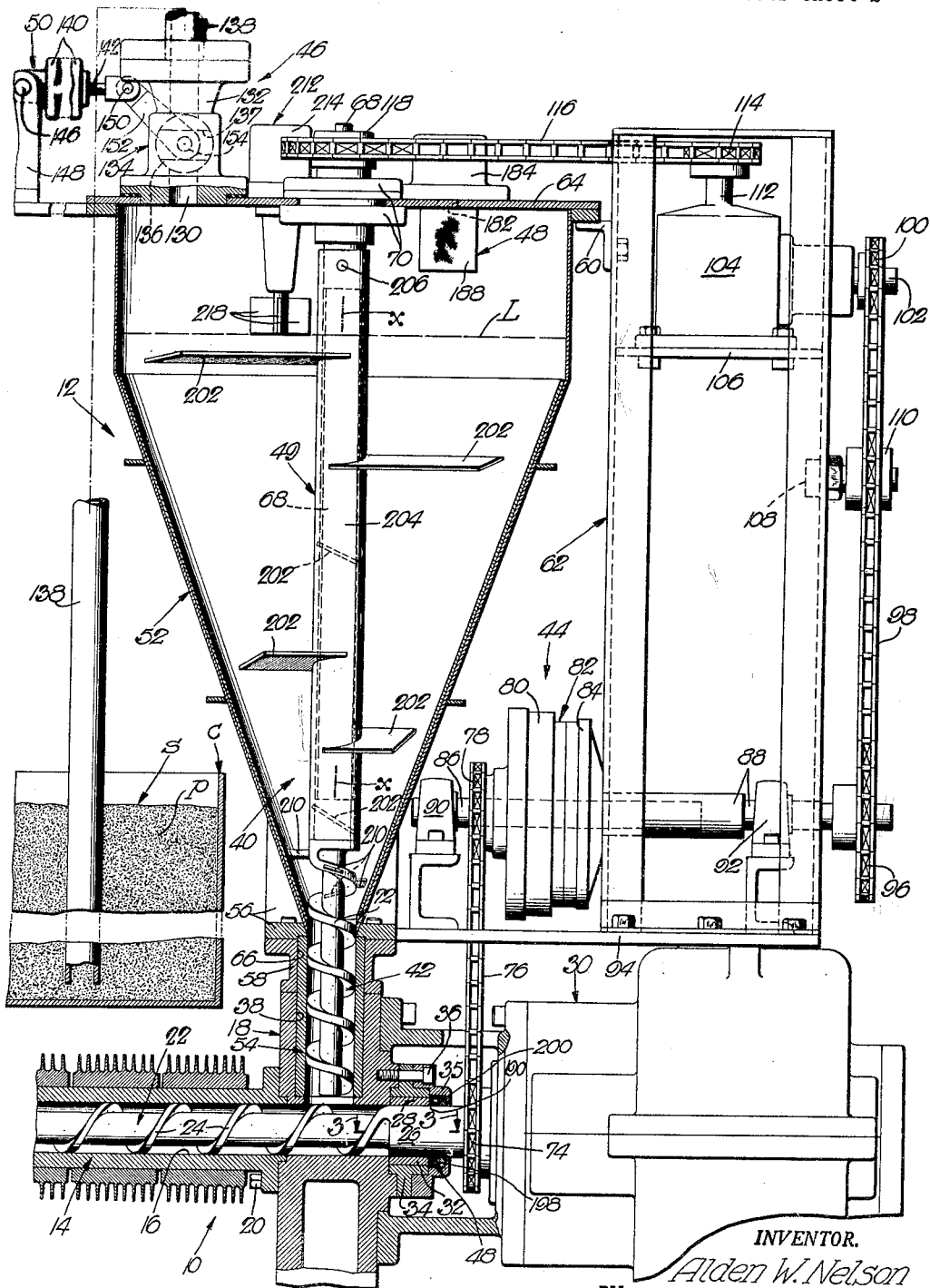

3,177,527
Patented Apr. 13, 1965

3,177,527
EXTRUSION APPARATUS WITH CONTINUOUS STOCK INFEED
Alden W. Nelson, West Mystic, Conn., assignor to Crompton & Knowles Corporation, Worcester, Mass., a corporation of Massachusetts
Filed July 16, 1962, Ser. No. 209,930
4 Claims. (Cl. 18—12)

This invention relates to the extrusion of plastics in general, and to apparatus for and a method of feeding plastic of fine granular type into an extrusion cylinder in particular.

While for extrusion purposes plastic of fine granular type, including powder type, is becoming more and more attractive owing to its low cost, its permissible high extrusion rate and facile plasticity control, as well as high uniformity and compactness of the grain structure of products extruded therefrom, extrusion of plastic of this type is, nevertheless, in limited use to this day owing to certain difficulties encountered in the operation. Thus, plastic of this type, and especially of powder type, is, by virtue of its exceeding denseness, characteristically sticky and for that reason will in the infeed to the extrusion cylinder hang-up or bridge all too readily which, unless prevented almost constantly, will lead to variations or even temporary interruptions in the stock feed into and in the cylinder with ensuing adverse effects on, if not spoilage of, an extrusion operation. Also due to the exceeding denseness of plastic of this type, the same will, on its infeed to and feed in an extrusion cylinder while in a dry state, leave no avenues for escape therefrom of any entrapped air and liberated volatiles, with the result that gaseous matter thus entrapped will form in the extruded product permanent bubbles or voids which almost invariably render the product unacceptable to the trade by reason of structural defect or unsightliness, or both. While there have been attempts to overcome these adverse effects of plastic of this type on its extrusion, these have at best been only partially successful and invariably slowed down the extrusion of such plastic way below the potential optimum rate at which it could be extruded on its quickest, thermally controllable, pass through the cylinder at which to reach the right plasticity for the purpose.

It is the primary object of the present invention to provide for feeding plastic stock of this type into the screw chamber of an extrusion cylinder in a manner that will fully overcome the aforementioned adverse effects of the plastic on its extrusion without imposing any limitation whatever on its extrusion rate, by constantly evacuating from the fed stock to its liquid state in the cylinder chamber all air and other gaseous matter even at the quickest possible, thermally controlled, pass of the stock through the cylinder at which it reaches the proper plasticity for its extrusion.

It is another object of the present invention to devise a method of supplying in the aforementioned manner plastic stock of this type to the screw chamber in an extrusion cylinder from a periodically charged down-passage thereto, according to which stock is constantly thrust through a lower zone of the passage into the cylinder chamber with adequate compacting force to drive entrapped air from the thrust stock, the stock in the upper passage zone above this lower zone is constantly tumbled to permit the escape of air therefrom and avoid stock hang-up in the passage, and all gaseous matter is evacuated from the stock in the cylinder chamber by constantly subjecting the latter to a partial vacuum, with the passage being preferably also constantly subjected to a partial vacuum and periodically charged with stock by suction.

It is a further object of the present invention to provide structurally simple and reliably performing apparatus for supplying plastic stock of this type to the screw chamber in an extrusion cylinder in accordance with the aforementioned method.

Another object of the present invention is to provide apparatus of this kind in which the aforementioned down-passage to the cylinder chamber is funnel-shaped with the flared and continuing cylindrical parts thereof being formed by a hopper and continuing bore in the cylinder to the forward feed screw therein, and the stock in these upper and lower passage zones is tumbled and thrust, respectively, in accordance with the aforementioned method, by a paddle wheel and a stock infeed screw in the hopper and continuing bore in the cylinder, respectively. With this arrangement, any entrapped air in the stock reaching the infeed screw will by the stock-compacting action of the latter be driven from this stock, with by far the easiest escape route being upwards in the hopper wherein the tumbling stock permits ready seepage of all air therein to the top of the hopper, so that the stock reaching the forward feed screw in the cylinder is virtually free of entrapped air.

A further object of the present invention is to provide apparatus of this kind in which the cylinder chamber is, in accordance with the aforementioned method, subjected to a partial vacuum from a constantly evacuated space which is in communication with the cylinder chamber solely by the usual play of the rear journal of the forward feed screw in its bearing, whereby in this simple manner the cylinder chamber is effectively evacuated of all gaseous matter while evacuation of stock therefrom is largely blocked.

It is another object of the present invention to provide apparatus of this kind in which the down-passage to the cylinder chamber is, in accordance with the aforementioned method, preferably also constantly subjected to a partial vacuum and periodically charged with stock by suction, by keeping the aforementioned hopper sealed and providing communication between the interior of the same at its top and a constant vacuum source, and connecting the inlet and outlet of a suitable valve with a suction conduit and the interior of the hopper at its top, respectively, with the suction conduit dipping into a supply of stock. In thus constantly subjecting the interior of the hopper to a partial vacuum and vacuumatically charging the same with stock on periodic opening of the valve, only the barest minimum of air will be entrapped in the stock on its delivery into the hopper and this air will speedily be evacuated from the delivered stock. Furthermore, this constant partial vacuum and the aforementioned compacting of the stock by the infeed screw and constant partial vacuum in the cylinder chamber combine in evacuating all gaseous matter from the stock with such rapidity and completeness that the stock may pass through the cylinder at the quickest rate at which it will, under readily maintained thermal control, reach correct plasticity for its extrusion and the extruded product will assuredly have no traces of bubbles or voids. Moreover, with the partial vacuum in the hopper and cylinder chamber being preferably kept so high as to permeate all stock in its dry state, including that in the infeed screw, the partial vacuum in the cylinder chamber will have no tendency to evacuate any stock from the latter.

It is a further object of the present invention to make provisions in apparatus of this kind for automatically operating the aforementioned valve for recharging the hopper with stock on a predetermined drop of the stock level below a predetermined maximum level therein, with these provisions including a timer control which for each recharge of the hopper causes repeated opening and closing of this valve for preset periods during which the partial vacuum in the hopper will drop to a permissible extent at which air evacuation will still be highly effective and will be permitted to rise to its normal high, respectively.

Another object of the present invention is to provide apparatus of this kind in which the upward flare of the hopper from the infeed bore in the cylinder is, for enhanced descent of the stock therein without hang-up or bridging, preferably at a rather steep angle, yet the infeed screw will at all times be readily reached by sufficient stock to keep it filled by extending this screw for some distance into the hopper.

It is a further object of the present invention to provide apparatus of this kind in which complete stock-charging of the infeed screw occurs with even greater assurance, by providing this screw over its aforementioned extent into the hopper with a plurality of paddles which cam the confronting stock downwardly with ensuing wedging of the same into the screw by the lower part of the hopper.

Another object of the present invention is to provide apparatus of this kind in which the aforementioned paddle wheel and infeed screw are conveniently driven not only in unison but also from the power drive of the forward feed screw through intermediation of a slip clutch which preferably is of a type that may be set to slip at different torques. With this arrangement, there is but one prime mover required for the drive of the forward-feed and infeed screws and the paddle wheel, and the drive of the paddle wheel and infeed screw will, in the absence of slippage of the clutch, remain at the same fixed ratio to the drive of the forward feed screw at any operating speed of the latter. Of far greater importance, however, is the intermediation of the slip clutch in the drive of the paddle wheel and infeed screw, with this clutch being preferably set to slip more or less constantly at a torque at which the infeed screw will deliver to the cylinder chamber stock under a substantially constant pressure which is sufficiently high to assure stock continuity in the successive infeed and forward-feed screws at any instant without, however, interfering with the partial vacuum in the hopper and cylinder chamber in its aforementioned permeation of all dry stock for assured complete evacuation of all gaseous matter therefrom.

A further object of the present invention is to provide apparatus of this kind in which the aforementioned drive of the paddle wheel and infeed screw is, from the slip clutch thereof to these driven wheel and screw parts, in two successive stages of speed-up and speed-reduction types, respectively, whereby the slip clutch may advantageously be driven at rather high speed while transmitting rather low torque, with the result that the clutch will readily respond in slippage to the correspondingly set low torque and sustain a minimum of wear. This favorable slippage response and low wear of the clutch will even be enhanced on driving the latter from the power drive of the forward feed screw at stepped-up speed.

Another object of the present invention is to provide apparatus of this kind in which there is a zone in the forward feed screw itself in which the aforementioned partial vacuum in the cylinder chamber will exert itself with optimum effectiveness in evacuating any remnants of gaseous matter from the stock on its forward feed, by leading the aforementioned stock infeed bore in the cylinder into the cylinder chamber somewhat ahead of the rear end of the flight of the forward feed screw.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary end view of an extruder with stock infeed equipment which embodies the present invention;

FIG. 2 is a side view, partly in section and partly in elevation, of the extruder and stock infeed equipment, with the section being taken on the line 2—2 of FIG. 1;

FIG. 3 is an enlarged fragmentary section taken on the line 3—3 of FIG. 2;

FIG. 4 is a diagrammatic illustration of certain controls of the stock infeed equipment; and FIG. 5 is a side view of a certain operating device of the stock infeed equipment.

Referring to the drawings, and more particularly to FIGS. 1 and 2 thereof, the reference numeral 10 designates an extruder which features a stock infeed 12. As shown in FIG. 2, the extruder 10 comprises a conventional extrusion cylinder 14 with a bore or chamber 16 which is continued rearwardly in a customarily separate feed block 18 on which the cylinder is suitably mounted, as by bolts 20, for instance. Turnable in the cylinder bore 16 is the usual stock screw 22 having one or more spiral flights 24, in this instance one flight, for the forward feed of stock in the bore to its discharge end and through a continuing delivery head with an extrusion die (neither shown). The stock screw 22 has the usual rear shank 26 which is journalled in a bearing 28 and extends rearwardly therebeyond for connection with a suitable power drive (not shown) in a casing 30. The bearing 28 is in this instance in the form of a sleeve 32 in a bracket 34 which through a retainer 35 and screws 36 is secured to the feed block 18. The feed block 18 has, for stock infeed to the cylinder bore 16, a throat which in this instance is a cross-bore 38.

The stock infeed 12 has as its principal elements a down-passage 40 to the cylinder bore 16, an infeed screw 42 with a power drive 44, stock-supplying provisions 46, a vacuum system 48, stock-tumbling provisions 49, and control means 50 for the stock-suplying provisions 46.

The down-passage 40 is in this instance provided by an upright hopper 52 and a downwardly continuing barrel 54 that leads laterally into the cylinder bore 16. The hopper 52, which is preferably largely frusto-conical in shape, is at its lower end mounted in a support bracket 56 on a pillar 58 on top of the feed block 18, and is at its upper end suitably anchored to an angle brace 60 of an upright frame 62 on top of the casing 30. The hopper 52 is at its top permanently closed by a cover 64. The barrel 54 is in this instance a cylindrical sleeve which is fittedly received in the cross-bore 38 in the feed block 18 and a continuing bore 66 in the pillar 58.

The infeed screw 42, which is received in the barrel 54 and in this instance extends for some distance upwardly in the hopper 52, is formed or mounted on a shaft 68 which is journalled in, and extends through, a bearing 70 in the top cover 64. The screw 42 has one or more spiral flights 72, in this instance one flight, for stock infeed to the cylinder bore 16. While it is entirely feasible to provide a separate prime mover for the drive of the infeed screw 42, the power drive 44 of this screw is in this instance derived from the power drive of the stock screw 22. To this end, the rear shank 26 of the stock screw 22 carries a sprocket 74 which through a chain 76 is drivingly connected with a sprocket 78 on the driving member 80 of a slip clutch 82 having a companion driven member 84. The clutch members 80 and 84 are carried by telescoping shafts 86 and 88, respectively, which are journalled in bearing brackets 90 and 92, respectively, on the base 94 of the frame 62. Shaft 88 carries a sprocket 96 which through a chain 98 is drivingly connected with a sprocket 100 on the input shaft 102 of a speed reducer 104 on a platform 106 of the frame 62. Carried by a crossbar 108 for suitable adjustment thereon is an idler sprocket 110 for tensioning the chain 98. Carried by the output shaft 112 of the speed reducer 104 is a sprocket 114 which through a chain 116 is drivingly connected with a sprocket 118 on the upper end of the shaft 68 outside the hopper 52. The slip clutch 82 (FIG. 2), which is preferably of air-operated type, is available on the market and is preferably settable to slip at different torques. For simplicity of illustration, however, this preferred but somewhat complex clutch is not shown in detail, and there is shown in FIG. 5 in lieu thereof a simpler mechanical slip clutch 82a which also is settable to slip at different torques. Thus, the driving and driven members 80a and 84a of this clutch 82a are mounted and splined, respectively, on the respective telescoping shafts 86a and 88a, with the clutch member 84a being with its friction face 120 urged against the friction face 122 of its companion member 80a by a spring 124 which bears against a nut 126 on a threaded portion of the shift 88a. Thus, the clutch 82a may be set to slip at different torques on varying the compression of the spring 124 by adjustment of the nut 126, with another nut 128 serving to lock nut 126 in its adjusted position.

The stock-supplying provisions 46 include, for stock introduction into the hopper 52, an opening or port 130 in the cover 64 which is normally kept closed owing to constant subjection of the interior of the hopper to a partial vacuum as more fully described hereinafter, and is opened only briefly for periodically supplying the hopper with stock. To this end, the port 130 is in this instance the flow passage through the casing 132 of a stock valve 134 on the cover 64 having a turnable cock 136 with a bore 137 for opening and closing the valve passage. The other or outer end of the valve passage 130 is in communication with a stock infeed conduit 138 which is adapted to dip into a supply s of plastic stock p in a container c for vacuumatic withdrawal of stock therefrom and delivery to the hopper as further described hereinafter.

For opening and closing the stock valve 134, there is provided a cylinder 140 and double-acting plunger 142 therein and a control valve 144 (FIG. 4). The cylinder 140 is at its rear pivotally supported at 146 in a bracket 148 on top of the hopper 52 (FIG. 2) and its plunger 142 is at 150 pivotally connected with an arm 152 on one of the opposite journals 154 of the valve cock 136. The control valve 144, which may be of any suitable type, has a casing 156 with a chamber 158 and a sliding valve 160 therein (FIG. 4), as well as conduits 162, 164 and 166, of which conduit 162 connects the valve chamber 158 with a source of fluid under pressure, such as compressed air, for instance, while the conduits 164 and 166 connect the valve chamber 158 with the rear and front ends, respectively, of the cylinder 140 (FIG. 2). The valve casing 156 is further provided with vent openings 168 and 170. Thus, with the valve 160 in the position shown in FIG. 4, the rear end of the cylinder 140 is vented via conduit 164 and opening 168 in the valve casing 156, while fluid under pressure is admitted to the front end of the cylinder 140 via conduit 166, with the result that the stock valve 134 is in the closed position shown in FIG. 2 in which the bore 137 in its cock 136 is displaced 90° from alignment with the valve passage 130. Conversely, on shifting the sliding valve 160 to its leftmost position (FIG. 4), the stock valve 134 will be opened, as will be readily understood. As shown in FIG. 4, the sliding valve 160 is by a spring 172 normally urged into the position in which the stock valve 134 is closed.

The vacuum system 48 makes for constant evacuation of air and other gaseous matter from the stock in the hopper 52, barrel 54 and cylinder bore 16, as well as for vacuumatic stock delivery into the hopper 52 whenever the stock valve 134 is opened. To this end, the interior of the hopper 52 and the cylinder bore 16 are in direct communication with a vacuum source, such as a vacuum pump 180, for instance (FIG. 1). For its connection with the vacuum pump 180, the hopper 52 has in its top cover 64 an opening or port 182 that is in open communication with a chamber in a casing 184 which through a conduit 186 with an intermediate valve 187 is connected with the intake side of the vacuum pump 180. The port 182 in the top cover 64 of the hopper is shielded from the interior of the hopper by a suitable filter 188 which is permeable to air and other gaseous matter but impermeable to stock of fine granular and even powder form.

For connection of the cylinder bore 16 with the vacuum pump 180, there is arranged directly in the rear of the stock screw bearing 32 a ring chamber 190 (FIG. 2) which through a side inlet 192 in the retainer 35, bracket 34 and bearing 32 (FIG. 3), and a conduit 194, is connected with the other vacuum conduit 186 (FIG. 1). The vacuum conduit 194 preferably also has an interposed valve 195 and is connected with the other vacuum conduit 186 preferably between the interposed valve 187 therein and the vacuum pump 180. Significantly, the cylinder bore 16 is in sole communication with the ring chamber 190 by the play of the stock screw shank 26 in the bearing 32 owing to its journal fit therein. The ring chamber itself is formed around the stock screw shank 26 by a frusto-conical skirt 196 of an annular gasket 198 which is interposed between the rear end of the bearing 32 and a restraining collar 200 in the retainer 35, with the gasket 198 being resilient so that its skirt 196 will effectively seal the ring chamber from the atmosphere rearwardly of the stock screw shank 26.

The stock for which the present infeed 12 is designed and particularly adapted is of fine granular kind, and especially powder kind, which, owing to its denseness, is characteristically sticky and for that reason would all too readily hang-up or bridge in the hopper 52 if it were not for the stock-tumbling provisions 49 in the exemplary form of a paddle wheel having a plurality of radial paddles 202 on a sleeve 204 which is conveniently slipped over the infeed screw shaft 68 and simply pinned thereto at 206 so as to be driven therewith. The paddles 202, which are substantially equally spaced from each other over most of the stock region in the hopper and extend into close proximity to the hopper wall for optimum reach into the stock, lie in planes which are so inclined to their rotary axis $x$ that on their drive with the infeed screw 42 they cam the confronting stock upwardly for its subsequent gravitational tumble therefrom. The stock which is thus constantly tumbled will not only be deprived of any opportunity to hang-up or bridge in the hopper, but will also afford ready seepage of any remaining entrapped air to the top of the hopper for ready evacuation therefrom.

While the exemplary paddles 202 will advantageously tumble the stock in the hopper, they may also be arranged to cam the stock downwardly or merely to slice through the stock without camming it either upwardly or downwardly, in which case hang-up or bridging of the stock in the hopper will be avoided but upward seepage of air through the stock will not be nearly as free as in the preferably tumbled stock. Ready upward seepage of air through the stock by its preferred tumbling is particularly advantageous since despite comparative freedom of the stock from entrapped air owing to its vacuumatic delivery to the hopper and subjection to the partial vacuum therein, remnants of entrapped air in the stock will, on its compacting by the infeed screw 42, be driven therefrom and advantageously escape upwardly through the stock.

For optimum stock capacity of the hopper 52 at a readily maintained high vacuum therein and constant and substantially complete evacuation of entrapped air in the stock, the hopper is preferably largely frusto-conical as described, but its cone is also rather steep to induce descent of the stock to the infeed screw 42 without hang-up or bridging despite the paddle wheel 49. However, in order that the infeed screw 42 will, despite the steep cone shape of the hopper, be readily reached at all times by sufficient stock to keep it filled, the infeed screw is extended into the hopper for some distance, and preferably over at least the extent of a full turn of its flight means 72, with the flight of this screw within the confines of the hopper being preferably and advantageously provided with paddles 210 which, in contrast to the exemplary paddles 202 of the wheel 49, are arranged to cam the confronting stock downwardly for its forced wedge into the screw by the lower end of the hopper (FIG. 2).

The control means 50 cause automatic opening and closing of the stock valve 134 for recharging the hopper 52 with stock whenever the stock level therein drops to a predetermined recharge level like or similar to that indicated by the dotted line L (FIG. 2). To this end, the control means provide an instrumentality 212 on the top cover 64 of the hopper which in this instance has in a casing 214 a motor 216 (FIG. 4) the shaft of which extends into the hopper (FIG. 2) and has a plurality of fins 218 which, when reached by stock above the recharge level L, stall the motor 216. The motor 216, which during operation of the extruder is constantly connected with a power line 220 (FIG. 4), is turnable in the casing 214 and is normally urged into an operative position when the stock level in the hopper drops to the recharge level L and clears the fins 218 for the drive of the motor 216. However, as soon as the stock level rises above the recharge level and the fins 218 stall the motor 216 in consequence, the latter is, by its torque exerted on the stalled fins 218, shifted into and held in an inoperative position until the descending stock in the hopper again clears the fins 218 and permits the motor to run and be returned to its operative position. Since this instrumentality 212 is available on the market and per se forms no part of the present invention, a more detailed disclosure thereof is unnecessary.

Also included in the control means 50 is a timer motor 22 (FIG. 4) which through a switch 224 is connectible with and disconnectible from the power line 220. The switch 224 is coupled to the motor 216 so as to be closed and opened by the latter in its described operative and inoperative positions, respectively. Associated with the timer motor 222 is a commercially available timer 226 with a switch 228, a time dial 230, a time-indicating hand 232 and settable time hands 234 and 236. The dial 230 has graduations marked in successive predetermined time intervals, such as seconds, for instance, from a zero time graduation to both sides thereof. The operation of the timer 226 is such that with the timer motor 222 idle or coming to a stop, the indicator hand 232 points at the zero graduation and is returned thereto, respectively, and with the start of the timer motor and during its run the indicator hand 232 will travel from the zero graduation for the first time clockwise to the graduation to which the hand 236 is set, whereupon the indicator hand 232 will reverse and travel past the zero graduation to the graduation to which the other hand 234 is set. The indicator hand 232 will thereupon again reverse and travel to the graduation to which the hand 236 is set, there to reverse again and travel to the graduation to which the hand 234 points. The indicator hand 232 thus travels back and forth while the timer motor 222 is running, with each forward and backward course lasting 8 seconds at the exemplary setting of the hands 234 and 236. The indicator hand 232 is so operatively connected with the switch 228 as to close the same on each clockwise pass from the zero graduation to the set hand 236, i.e., for 5 seconds in the present example, and to open this switch on each counterclockwise pass and succeeding clockwise pass from the set hand 234 to the zero graduation, i.e., for 11 seconds in the present example.

Further included in the control means 50 is a relay 240 (FIG. 4) which on energization shifts the sliding member 160 of the control valve 144 to its left position in which the stock valve 134 is opened, as described, with the switch 228 on each closure thereof connecting the relay 240 with the power line 220.

Thus, when the stock level in the hopper 52 drops to its recharge level L (FIG. 2) and permits motor 216 to run and close switch 224 (FIG. 4), switch 228 will immediately be closed by the timer 226 for opening the stock valve 134 for the exemplary set period of 5 seconds during which stock is vacuumatically delivered into the hopper, whereupon the switch 228 will be opened, and hence the stock valve 134 closed, for the exemplary set period of 11 seconds, with the switch 228 then being again closed, and hence the stock valve 134 reopened, for further 5 seconds. The stock valve 134 is thus opened for the exemplary preset period of 5 seconds and then closed for the exemplary preset period of 11 seconds as often as is required to bring the stock level in the hopper to a predetermined top level at which the stock will cover the fins 218 on the shaft of the motor 216 sufficiently to stall the latter. Of course, the moment the motor 216 stalls from this cause, switch 224 is opened and the timer motor 222 deenergized in consequence, with ensuing immediate spring-return of the sliding member 160 of the control valve 144 to its position in FIG. 4 and, hence, immediate closing of the stock valve 134, as will be readily understood. With each stock-recharge cycle of the hopper being under the control of the exemplary finned shaft of the motor 216 as explained, the drop of the stock level in the hopper between successive stock recharges is relatively short, which is advantageous in that a relatively high vacuum in the hopper may readily be maintained. Further, ready maintenance of a relatively high vacuum in the hopper during each stock-recharge cycle of the same is further enhanced by the set pause between successive openings of the stock valve 134 during which the vacuum in the hopper will readily recover to its normal high, with each opening of the stock valve being for a set period during which the vacuum in the hopper will drop insufficiently to effect its highly effective evacuation action on any air or other gaseous matter in the stock. Also, these favorable vacuum conditions in the hopper have in many cases been readily achieved on a single repeat opening of the stock valve for each complete stock recharge of the hopper, which is further advantageous by keeping each stock-recharge cycle to a minimum overall period during which the vacuum in the hopper will necessarily fluctuate.

The present invention also involves a method of supplying plastic stock to the screw chamber in an extrusion cylinder in accordance with which the present stock infeed performs. This method provides for constantly thrusting stock downwardly through a lower zone of a periodically stock-charged down-passage into the screw chamber with adequate compacting force to drive entrapped air from the thrust stock, constantly tumbling the stock in the upper passage zone above this lower zone to permit the escape of air therefrom and also avoid stock hang-up or bridging in the passage, and evacuating all gaseous matter from the stock in the screw chamber by constantly subjecting the latter to a partial vacuum, with all entrapped air in the stock in the passage being preferably also evacuated and the passage periodically charged with stock by suction, by constantly subjecting the passage to a partial vacuum.

While the present stock infeed is highly practical for plastics of most any granular sizes, the same is particularly practical for plastics of the finer granular sizes, and especially for plastics of powder density which are more or less sticky and readily hang-up or bridge, as well as leave no ready avenues of escape for entrapped air or other gaseous matter therein. The present infeed copes with these disadvantages of plastics of the finer granular and powder kinds equally and with complete success. Thus, by tumbling the stock in the hopper 52 and thrusting the stock in the infeed barrel 54 downwardly into the forward feed screw 22 in the cylinder bore 16 by the paddle wheel 49 and infeed screw 42, respectively, in accordance with the described method, any entrapped air in the stock reaching the infeed screw will by the compacting action of the latter be driven from this stock, with by far the easiest escape route being upwards in the hopper wherein the tumbling stock permits ready seepage of all air therein to the top of the hopper, so that the stock reaching the forward feed screw is virtually free of entrapped air.

Further, by subjecting the cylinder bore, also in accordance with the described method, to a partial vacuum, and this via the usual play of the rear journal of the forward feed screw in its bearing owing to its journal fit therein, the stock in the cylinder bore is to the zone therein at which it reaches its liquid state effectively evacuated of all remnants of air and of all driven-off volatiles while evacuation of stock from the cylinder bore by vacuumatic action is largely blocked. Moreover, by sealing the hopper and constantly subjecting the interior thereof to a partial vacuum in accordance with the described method, and also vacuumatically charging the hopper with stock on periodic opening of the stock valve 134, only a minimum of air will be entrapped in the stock on its delivery into the hopper and this air will speedily be evacuated from the delivered stock. Furthermore, this constant partial vacuum in the hopper combines with the compacting of the stock by the infeed screw and the constant partial vacuum in the cylinder bore in evacuating all gaseous matter, air and driven-off volatiles, from the stock with such rapidity and completeness that the stock may pass through the cylinder at the quickest rate at which it will, under readily maintained thermal control, reach correct plasticity for its extrusion, and the extruded product will assuredly have no traces of bubbles or voids. Also, with the partial vacuum in the hopper and cylinder bore being preferably kept so high as to permeate all stock in its dry state, including that in the infeed screw, the partial vacuum in the cylinder bore will have no tendency to evacuate any stock therefrom. Of further advantage is the repeated opening of the stock valve for each stock recharge cycle of the hopper, which greatly facilitates ready maintenance of a relatively high vacuum in the hopper. Also, by arranging for the drive of the paddle wheel and infeed screw not only in unison with each other but also from the power drive of the forward feed screw through intermediation of a slip clutch which may be set to slip at different torques, there is but one prime mover required for the drive of the forward-feed and infeed screws and paddle wheel, and the drive of the paddle wheel and infeed screw will, in the absence of slippage of the clutch, remain at the same fixed ratio to the drive of the forward feed screw at any operating speed of the latter, which automatically adapts the stock infeed basically to any extrusion rate by the forward feed screw. Of far greater importance, however, is the preferred setting of the slip clutch to slip slightly more or less constantly at a torque at which the infeed screw will deliver to the cylinder bore stock under a substantially constant pressure which is sufficiently high to assure stock continuity in the successive infeed and forward-feed screws at any instant without, however, interfering with the partial vacuum in the hopper and cylinder bore in its permeation of all dry stock for assured complete evacuation of all gaseous matter therefrom. It will also be noted that the drive of the paddle wheel and infeed screw is, from the slip clutch thereof to these driven wheel and screw parts, in two successive stages of speed-up and speed-reduction types, respectively, whereby this clutch may advantageously be driven at rather high speed and transmit the relatively low torque required for the drive of the input shaft 102 of the speed reducer 104, with the result that the clutch will readily respond in slippage to the correspondingly set low torque and sustain inappreciable wear at the most. This favorable slippage response at low torque transmission and low wear of this clutch is even enhanced by its drive at stepped-up speed from the power drive of the forward-feed screw. Further, the upward flare of the hopper from the infeed barrel at a rather steep angle enhances the descent of the stock in the hopper without hang-up or bridging therein, yet by extending the infeed screw for some distance into the hopper this screw will at all times be readily reached by sufficient stock to keep it filled. Moreover, by providing the infeed screw over its extent in the hopper with the paddles 210 which cam the confronting stock downwardly, such stock will even be wedged into this screw by the lower part of the hopper.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a plastic stock extruder, the combination with an extrusion cylinder having a bore and continuing rear bearing, and a power-operated stock screw having a forward feed section in said bore and a rear shank received with a journal fit in, and extending through, said bearing, of a stock infeed providing an upright hopper of general inverted cone form having at its upper end two ports and at its lower end a downwardly extending barrel leading laterally into said cylinder bore, and being sealed except at said barrel and ports, means to open and close one of said ports for stock introduction into said hopper, a power-driven shaft in said hopper said bearing aperture and having a feed screw extension in said barrel, and power-operated stock-agitating means in said hopper; a vacuum source; and first and second conduit means for connecting the other port in said hopper and said cylinder bore, respectively, with said vacuum source with the play of said screw shank in said bearing owing to its journal fit therein forming the part of said second conduit means leading from said cylinder bore.

2. In a plastic stock extruder, the combination with an extrusion cylinder having a bore with a rear dry-stock zone, and a power-operated stock screw in said bore, of a stock infeed providing an upright hopper of general inverted cone form having at its upper end two ports and at its lower end a downwardly extending barrel leading laterally into said zone in said cylinder bore, and being sealed except at said barrel and ports, a power-driven shaft in said hopper having a feed screw extension in said barrel, and power-operated stock-agitating means in said hopper; hopper stock-charging means providing one of said ports in said hopper, a device shiftable into first and second positions in which to open and close said one port, respectively, and normally urged into said second position, a timer, first control means operative on operation of said timer repeatedly to shift said device into said first position for a predetermined period after a predetermined time interval between successive shifts, and other control means for rendering said timer operative and inoperative on the drop and rise of the stock level in said hopper to predetermined recharge and top levels, respectively; a vacuum source; and conduit means connecting the other port in said hopper and said zone of said cylinder bore with said vacuum source.

3. The combination in a plastic stock extruder as set forth in claim 2, in which said one port has stock inlet and outlet ends, said device is arranged to open and close said one port intermediate its ends, and said hopper stock-charging means further provides a conduit leading from said inlet end of said one port and adapted for dipping in a stock supply.

4. In a plastic stock extruder, the combination with an extrusion cylinder having a bore with a rear dry-stock zone and a rearwardly continuing bearing, and a power-operated stock screw having a forward feed section in said bore and a rear shank received with a journal fit in, and extending through, said bearing, of a stock infeed providing a generally conical upright hopper having at its wider upper end two ports and at its narrower lower end a downwardly extending barrel leading laterally into said zone in said cylinder bore, and being sealed except at said barrel and ports, means to open and close one of said ports for stock introduction into said hopper, a power-driven shaft in said hopper having a feed screw extension in said barrel, and power-operated stock-agitating means in said hopper; a vacuum source; and conduits connecting the other port in said hopper and said zone of said cylinder bore with said vacuum source, of which the conduit from said zone to said vacuum source is other than said barrel.

References Cited by the Examiner

UNITED STATES PATENTS

| | | | |
|---|---|---|---|
| Re. 23,948 | 2/55 | Fuller. | |
| Re. 24,079 | 10/55 | Mateer | 222—413 X |
| 563,260 | 7/96 | Cooper | 222—413 |
| 682,390 | 9/01 | Schrader | 18—12 |
| 881,365 | 3/08 | Auchu | 18—12 |
| 881,367 | 3/08 | Auchu | 18—12 |
| 1,092,451 | 4/14 | Pierce. | |
| 1,156,096 | 10/15 | Price | 18—12 |
| 1,192,250 | 7/16 | Weyant | 222—413 |
| 2,005,886 | 6/35 | Brown. | |
| 2,014,617 | 9/35 | Fischer | 222—56 |
| 2,142,983 | 1/39 | Thurman. | |
| 2,365,374 | 12/44 | Bailey | 18—55 |
| 2,369,359 | 2/45 | MacWilliam et al. | 18—12 |
| 2,409,521 | 10/46 | Wiley | 18—55 |
| 2,573,566 | 10/51 | Hammann | 222—413 X |
| 2,674,396 | 4/54 | Peterson | 222—56 |
| 2,699,272 | 1/55 | Barth | 222—413 |
| 2,707,306 | 5/55 | Weber et al. | 18—12 XR |
| 2,791,802 | 5/57 | Weber | 18—12 XR |
| 2,933,175 | 4/60 | Gray | 18—12 |
| 3,008,184 | 11/61 | Fritsch | 18—12 |
| 3,047,034 | 7/62 | Sassmannshausen et al. | 222—413 X |
| 3,065,502 | 11/62 | Torenian | 18—12 |
| 3,110,420 | 11/63 | Brewer | 222—56 |
| 3,119,526 | 1/64 | Sutton | 222—56 |

WILLIAM J. STEPHENSON, *Primary Examiner.*

ALEXANDER H. BRODMERKEL, ROBERT F. WHITE, MICHAEL V. BRINDISI, *Examiners.*